Jan. 15, 1952     H. CHIREIX     2,582,310

SELF-IDENTIFYING REFLECTING RADIO BEACON

Filed Aug. 2, 1946

Inventor
HENRI CHIREIX
By
Haseltine, Lake & Co.
Attorneys

Patented Jan. 15, 1952

UNITED STATES PATENT OFFICE 2,582,310

SELF-IDENTIFYING REFLECTING RADIO BEACON

Henri Chireix, Paris, France, assignor to Societe Française Radio-Electrique, a corporation of France Application August 2, 1946, Serial No. 688,149
In France February 15, 1944

Section 1, Public Law 690, August 8, 1946
Patent expires February 15, 1964

6 Claims. (Cl. 343—18)

The present invention relates principally to the provision of artificial obstacles or beacons or landmarks which are easily identifiable and are intended to serve as reference marks for navigation by means of the known method of detecting obstacles by short electromagnetic waves, it being possible for the electromagnetic waves to be replaced by ultra-sounds.

Two principal methods of navigation by electromagnetic detection are known. In the first method, a transmitter of short electromagnetic waves located on board periodically transmits electromagnetic pulses of very short duration, which are reflected by the obstacles encountered and are received back on board and recorded on a cathode-ray oscillograph. The time elapsing between the outgoing pulse and the incoming pulse due to the reflected waves indicates the distance, while the direction may be obtained by means of the usual methods employed in radiogoniometry.

In the second method, the electromagnetic wave transmitter located on board is modulated in frequency according to a law linear with time, for example by means of a saw-toothed voltage. In this case, the reflected wave received differs in frequency from the wave transmited at the same instant by an amount depending solely on the distance from the obstacle. The distance may then be determined by a frequency measurement, while the direction can be determined by the methods usual in radiogoniometry.

In fact, the observation is complicated by the fact that the reflection of the eelctromagnetic waves takes place at all the obstacles situated in the field of the transmitter, and it therefore becomes essential to be able to identify the obstacle or landmark which is to be used for navigation from the other obstacles or landmarks which may be situated in the neighbourhood; this is therefore the principal object of the invention.

Figure 1:
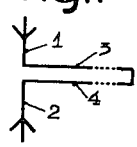
Figure 2:
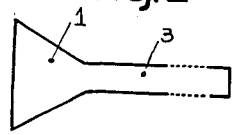
Figure 3:
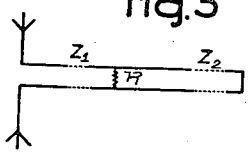
Figure 4:
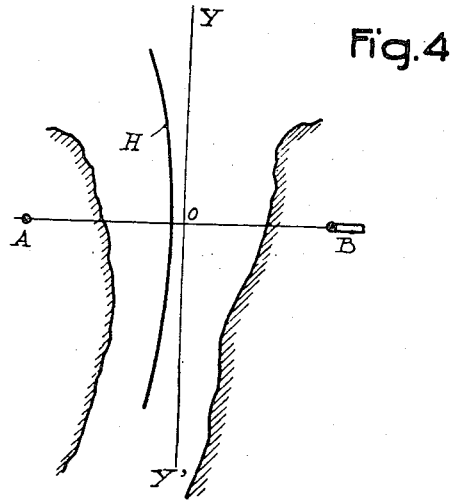
Figure 5:
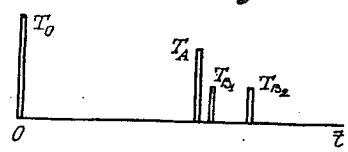

The invention is illustrated in connection with five figures, in which Figs. 1, 2 and 3 show several embodiments of this invention and Figs. 4 and 5 are used in the explanation thereof.

According to the invention, the obstacle or beacon is constituted by an aerial, preferably but not necessarily directional, tuned to the high-frequency wave transmitted, and connected to a line which is adapted or impedance matched so that there can be no reflection of energy at this point. The line, the time of transmission of which is characteristic of the beacon, is, moreover, terminated at its other extremity at an impedance differing widely from its characteristic impedance (open or short-circuited, for example). Under these conditions, and in accordance with the first method referred to, the pulse reaching the aerial gives rise to a first reflected echo, and then to a second echo retarded by twice the time of propagation along the line. The obstacle or beacon is therefore identified by two echos separated by a clearly determined time.

According to the second method referred to, the tuned aerial is the point of origin of two high-frequency currents, the respective frequencies of which differ by the amount due to the frequency modulation during the same time. These two currents give rise to beats, the frequency of which is characteristic of the beacon considered.

When metric waves are employed, the aerials are constituted by aerials which are closed on coaxial lines or cables, as is shown in Figure 1, in which 1 and 2 designate the two aerial elements, 3 and 4 the line conductors (shown as a double line, but which may be of the concentric type). In the case of shorter waves, the same aerials may be cone-shaped, such as 1, terminated by dielectric guides such as 3 (Figure 2), of sufficient length which reflect the electromagnetic waves at their extremity.

It will be seen that, owing to the matching between the aerial and the line or the guide, there is no reflection at the point of intersection, and there will therefore only be two echoes and not an indefinite number thereof.

As shown in Figure 3, the method may be extended so as to produce three echoes. In the latter case, the aerial is matched to a first line of characteristic impedance $Z_1$, which is followed by a second line of characteristic impedance $Z_2$, for example, short-circuited at its opposite extremity. A resistance R shunts the two lines at their points of intersection. This resistance is so dimensioned that there is reflection in the direction away from the aerial, and, on the other hand, matching in the opposite direction, so that the wave reflected at the short-circuit returns to the aerial without further reflection at the point of intersection of the two lines. For example, it is possible to make $Z_1=R=2Z_2$.

Thus, according to the method of electromagnetic detection employed three pulses characterising the beacon or three frequency beats will be obtained.

It will be seen that the methods described have the advantage that they only set up absolutely passive and consequently unsupervised systems at the fixed points.

Finally, a combination of two beacons will be described, which are entirely passive and therefore suitable for beaconing a channel. As shown in Figure 4, there are arranged on either side of the channel, on the one hand a tuned aerial A which is directly connected in short-circuit (line of zero transmission time) and on the other hand a tuned aerial B, provided with a reflection line according to the invention. Figure 5 shows the arrangement of the echos received in accordance with the first method of detection when navigating a little outside the axis YOY' constituting the position of the points of equal distance from the two beacons. At To is shown the transmission pulse, at $T_A$ the echo of this pulse on the beacon A, at $T_{B1}$ and $T_{B2}$ the two successive echos of the same pulse on the beacon B. The images align themselves along the axis $Ot$, which is a time axis. The arrival of the pulse $T_A$ before the pulse $T_B$ shows that the craft is nearer to A than to B, and the association of the images $T_{B1}$, $T_{B2}$ at a constant distance apart permits of identifying the echo of B. If $T_{B1}$ were received before $T_A$ it would be deduced therefrom that the craft was on the other side of the route to be followed. It will be seen that an indication of the route and of the direction of movement away therefrom is obtained.

The following is produced by the second method of electromagnetic detection referred to:

1. A beat note emanating from B and characteristic of the installation, this beat note being supplied by the interference of the frequency due to the direct excitation of the aerial B by the transmission from the craft with the frequency due to the second excitation from the aerial B by the waves which have passed through the reflection line.

2. A beat note due to the interference of the wave reflected from the aerial A and of the wave reflected by the aerial B at the frequency of the second excitation of this aerial. (It is, in fact, no longer necessary to take into account the interference of the echo emanating from A with the echo emanating from B at the frequency of the direct excitation of B, the frequency of this interference being zero when the craft is on the route, and very low in the neighbourhood thereof.) This second beat note is higher or lower than the first according to the direction of the error in the route. Moreover, it characterises a clearly determined hyperbole (H), which permits of following curved channels.

It must be understood that numerous modified embodiments of the invention are possible within the scope of the various combinations of means indicated. The invention is also applicable to the ultra-sound method, the ultra-sound generator on board the craft being at a frequency which is regularly varied in time, and the aerials A and B being replaced by suitably syntonised resonators, one of which is provided with a line for the reflection of the acoustic vibrations.

I claim:

1. A course marking system in which radio-reflectors are placed in predetermined locations relative to the course to be outlined, a craft having a transmitter for launching pulse-modulated ultra-short waves of a given wave length towards said reflectors and a receiver for receiving the waves returned from said reflectors, said reflectors having mutually distinct reflection time characteristics, each reflector comprising an antenna tuned to said wave length, a transmission line connected to the antenna at one end and matched to it, an impedance very different from the line characteristic impedance and terminating said line at its other end.

2. In a navigational guide system for mobile craft in which the craft to be guided is provided with a transmitter of waves and with a corresponding receiver, and in which marker-beacons are placed in predetermined locations relative to the course of the craft, means enabling identification of the respective marker-beacons comprising at each beacon a reflector-aerial tuned to the frequency of the waves transmitted, a transmission line having delay characteristics distinct from those of other beacons and connections between it at one of the ends and said reflector-aerial, said connections effecting an impedance match so as to produce no reflected waves thereat, said line being terminated at its other end in an impedance widely different from its characteristic impedance so that it produces reflection of the waves and transmits them at said reflector-aerial at a predetermined time after the waves are directly retransmitted by said reflector-aerial.

3. A system according to claim 2, in which the identification enabling means includes a transmitter on the craft which transmits frequency modulated waves.

4. In a navigational guiding system according to claim 2, in which the marker-beacons are located substantially symmetrically on opposite sides of the course of the craft, opposite ones of the marker-beacons being provided with different numbers of delay lines and in which the craft transmitter transmits signals on frequency modulated waves, whereby the received pulse reflected over a delay line from one of the opposite marker-beacons is of higher or lower frequency than that of its opposite one depending on the direction of error in route of the craft.

5. In a navigational guiding system according to claim 4, in which one of said opposite marker-beacons has one delay line reflector and its opposite one reflects waves only directly from its reflector-aerial.

6. A course marking system in which radio-reflectors are placed in predetermined locations relative to the course to be outlined, a craft having a transmitter for launching pulse-modulated ultra-short waves of a given wave length towards said reflectors and a receiver for receiving the waves returned from said reflectors, said reflector having mutually distinct reflection time characteristics, each reflector comprising an antenna tuned to said wave length, a transmission line connected to the antenna at one end and matched to it, an impedance very different from the line characteristic impedance and terminating said line at its other end, at least one of these impedances being constituted of a second reflecting transmission line, bridged by a resistance at its input end so that its input impedance with respect to waves from the antenna is quite different from the characteristic impedance of the first line and that the impedance of the first line and bridging resistance is matched to the second line impedance with respect to waves reflected from the remote end of said second line.

HENRI CHIREIX.

REFERENCES CITED

The following references are of record in the file of this patent:

UNITED STATES PATENTS

| Number | Name | Date |
|---|---|---|
| 350,608 | Torre | Oct. 12, 1886 |
| 2,190,141 | Walker | Feb. 13, 1940 |
| 2,280,226 | Firestone | Apr. 21, 1942 |
| 2,408,848 | Hammond | Oct. 8, 1946 |
| 2,433,868 | Sensiper | Jan. 6, 1948 |
| 2,440,253 | Dodington | Apr. 27, 1948 |
| 2,461,005 | Southworth | Feb. 8, 1949 |